United States Patent
Dhesikan et al.

(10) Patent No.: US 10,439,879 B2
(45) Date of Patent: Oct. 8, 2019

(54) BANDWIDTH MANAGEMENT IN A NON-BLOCKING NETWORK FABRIC

(71) Applicant: CISCO TECHNOLOGY, INC., San Jose, CA (US)

(72) Inventors: Subhasri Dhesikan, San Jose, CA (US); Pradeep Kumar Kathail, Los Altos, CA (US); Sachin Vijay Vishwarupe, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 110 days.

(21) Appl. No.: 15/346,233

(22) Filed: Nov. 8, 2016

(65) Prior Publication Data

US 2018/0062930 A1 Mar. 1, 2018

Related U.S. Application Data

(60) Provisional application No. 62/382,666, filed on Sep. 1, 2016.

(51) Int. Cl.
*G06F 13/00* (2006.01)
*H04L 12/24* (2006.01)
(Continued)

(52) U.S. Cl.
CPC .......... *H04L 41/0896* (2013.01); *H04L 41/22* (2013.01); *H04L 43/0811* (2013.01);
(Continued)

(58) Field of Classification Search
CPC ............... H04L 29/08144; H04L 29/06; H04L 29/08072; H04L 29/08171; H04L 45/00; H04L 45/48; H04L 12/44; H04L 45/02; H04L 12/28; H04L 12/56; H04L 12/185; H04L 12/462; H04L 12/1854; H04L 12/4641; H04L 12/5695; H04L 29/06027; H04L 45/16; H04L 65/4076; H04L 45/38; H04L 45/125; H04L 47/32; H04L 47/2483; G06F 13/00
(Continued)

(56) References Cited

U.S. PATENT DOCUMENTS

2004/0196838 A1  10/2004  Zadikian et al.
2005/0185654 A1  8/2005  Zadikian et al.
(Continued)

FOREIGN PATENT DOCUMENTS

WO  WO 2014139375 A1  9/2014

*Primary Examiner* — Robert B Harrell
(74) *Attorney, Agent, or Firm* — Cindy Kaplan

(57) ABSTRACT

In one embodiment, a method includes discovering at a network controller, a topology and link capacities for a network, the network controller in communication with a plurality of spine nodes and leaf nodes, the link capacities comprising capacities for links between the spine nodes and the leaf nodes, identifying at the network controller, a flow received from a source at one of the leaf nodes, selecting at the network controller, one of the spine nodes to receive the flow from the leaf node based, at least in part, on the link capacities, and programming the network to transmit the flow from the spine node to one of the leaf nodes in communication with a receiver requesting the flow. An apparatus and logic are also disclosed herein.

20 Claims, 13 Drawing Sheets

(51) Int. Cl.
    *H04L 12/26*         (2006.01)
    *H04L 12/751*       (2013.01)
    *H04L 12/721*       (2013.01)
    *H04L 12/851*       (2013.01)
    *H04L 12/823*       (2013.01)
    *H04L 12/729*       (2013.01)

(52) U.S. Cl.
    CPC ...... *H04L 43/0864* (2013.01); *H04L 43/0882* (2013.01); *H04L 45/02* (2013.01); *H04L 45/125* (2013.01); *H04L 45/38* (2013.01); *H04L 47/2483* (2013.01); *H04L 47/32* (2013.01)

(58) Field of Classification Search
    USPC .................................. 370/408, 256; 709/226
    See application file for complete search history.

(56) References Cited

U.S. PATENT DOCUMENTS

2006/0251419 A1    11/2006    Zadikian et al.
2008/0063003 A1*   3/2008    O'Neal ............... H04L 12/1854
                                                        370/408
2015/0188731 A1    7/2015     Daly

* cited by examiner

US 10,439,879 B2

BANDWIDTH MANAGEMENT IN A NON-BLOCKING NETWORK FABRIC

STATEMENT OF RELATED APPLICATION

The present application claims priority from U.S. Provisional Application No. 62/382,666, entitled BANDWIDTH MANAGEMENT IN A NON-BLOCKING NETWORK FABRIC, filed on Sep. 1, 2016. The contents of this provisional application are incorporated herein by reference in its entirety.

TECHNICAL FIELD

The present disclosure relates generally to communication networks, and more particularly, to bandwidth management.

BACKGROUND

Content transmitted in a data center may include various size flows lasting for different durations. In one example, video content such as live media production may have a small number of long lasting large flows as compared to a typical data center environment that has a large number of small flows of short duration.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
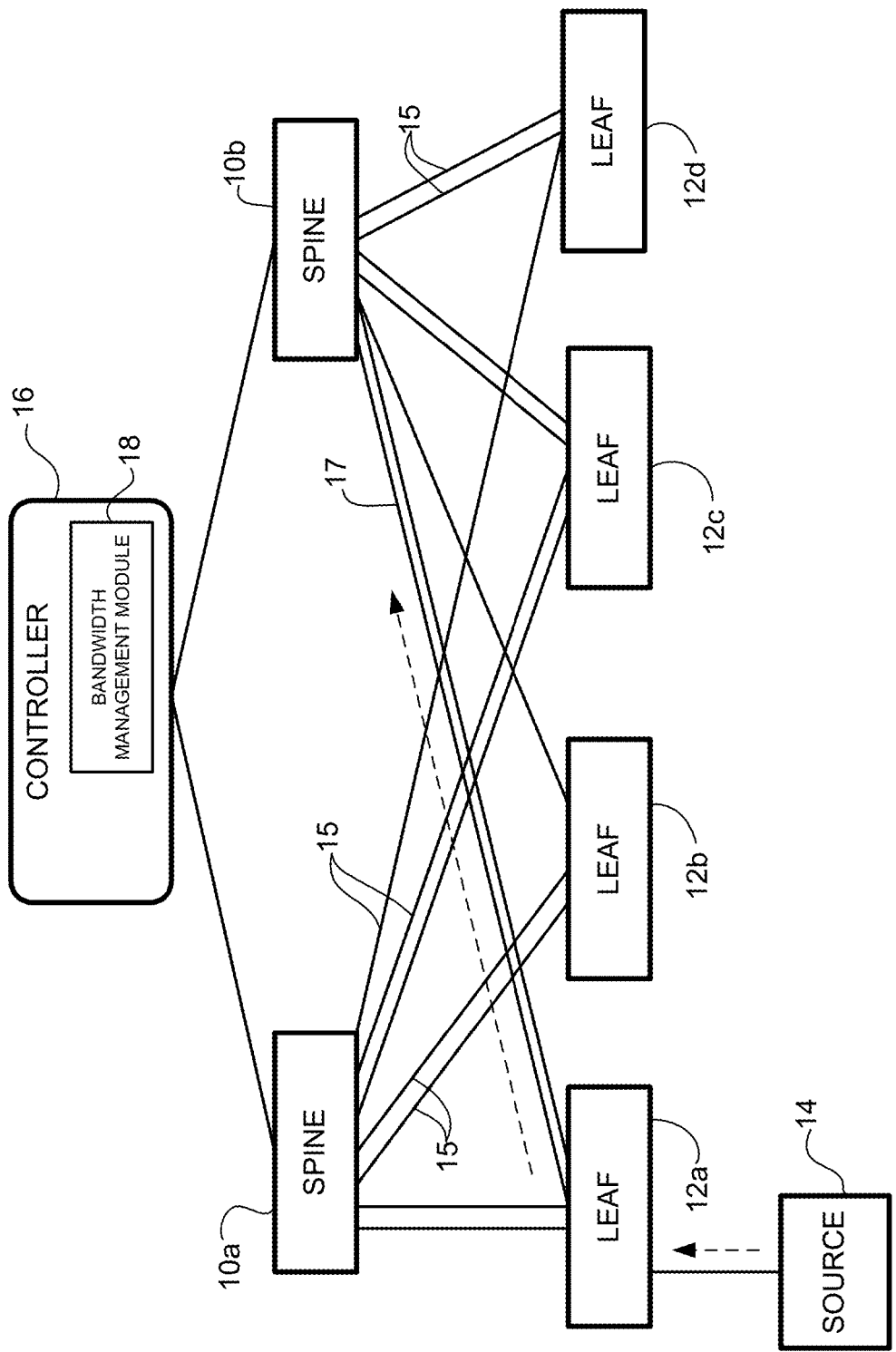
FIG. 1 illustrates an example of a network in which embodiments described herein may be implemented.

In one embodiment, a method generally comprises discovering at a network controller, a topology and link capacities for a network, the network controller in communication with a plurality of spine nodes and leaf nodes, the link capacities comprising capacities for links between the spine nodes and the leaf nodes, identifying at the network controller, a flow received from a source at one of the leaf nodes, selecting at the network controller, one of the spine nodes to receive the flow from the leaf node based, at least in part, on the link capacities, and programming the network to transmit the flow from the spine node to one of the leaf nodes in communication with a receiver requesting the flow.

In another embodiment, an apparatus generally comprises a plurality of interfaces for communication with a plurality of spine nodes and leaf nodes, a processor for discovering a topology and link capacities for a network, identifying a flow received from a source at one of the leaf nodes, selecting one of the spine nodes to receive the flow and an uplink for transmitting the flow to the selected spine node, programming the network to transmit the flow from the spine node to one of the leaf nodes in communication with a receiver requesting the flow, and memory for storing the topology and link capacities, the link capacities comprising uplink capacities for links transmitting flows from the leaf nodes to the spine nodes and downlink capacities for the links transmitting the flows from the spine nodes to the leaf nodes.

In yet another embodiment, logic is encoded on one or more non-transitory computer readable media for execution and when executed by a processor operable to discover at a network controller, a topology and link capacities for a network, the network controller operable to communicate with a plurality of spine nodes and leaf nodes, the link capacities comprising capacities for links between the spine nodes and the leaf nodes, identify at the network controller, a flow received from a source at one of the leaf nodes, select at the network controller, one of the spine nodes to receive the flow from the leaf node based, at least in part, on the link capacities, and program the network to transmit the flow from the spine node to one of the leaf nodes in communication with a receiver requesting the flow.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

A spine and leaf based network is an architecture that is often used in data centers. The spine and leaf network may comprise multiple spine and leaf network devices (e.g., switches), with multiple links therebetween. Hashing, LAG (Link Aggregation Group), and the like, may be used to transmit data in the data center environment when there are a large number of short duration flows, however, these mechanisms may not provide a non-blocking fabric. This becomes more of a problem when there are a small number of large, long lasting flows. For example, live media production may comprise a small number of long lasting large flows (e.g., 1.5G or 3G), as compared to a typical data center environment that has a large number of small flows of short duration. These video flows often need a zero loss, low latency and jitter, non-blocking fabric. Conventional load balancing used for a large number of short duration flows may not provide a sufficient non-blocking fabric.

Also faults, including both logical and physical failures, may occur in the network. While redundancy may be provided in live broadcast production with two network fabrics and use of SMPTE (Society of Motion Picture and Television Engineers) 2022-7, one network cannot remain down for the remaining duration of the session and has to rectify itself and ensure that it can establish non-blocking behavior for as many flows as possible.

Additional complications arise when total system bandwidth requirements exceed single spine capability and multiple spines are needed. With mostly multicast traffic in these cases, endpoints connected to different leafs may not be reachable by a single spine because of downstream bandwidth and additional flows may need to be created. All of this is preferably done with as little underutilization as possible, ideally matching downstream bandwidth to uplink bandwidth with zero (or minimal) underutilization.

Spine and leaf is often a preferred architecture for live video production because of scalability and consistency with generic data center network architecture. One example of a way to provide a non-blocking data center fabric with multiple spine and leaf nodes is to very lightly load the network. In one example implementation a drawback is that only one uplink and downlink may be used at any time between spine and leaf and this may only work for a single spine.

The embodiments described herein provide bandwidth management for multiple paths, including uplinks and downlinks, between nodes in a network to provide a non-blocking (e.g., zero or minimal drop) fabric. One or more embodiments allow for implementation of a multiple spine and leaf data center fabric with non-blocking architecture. The embodiments may further provide self-healing capabilities and detailed visibility to an application in times of impact. In one example, the embodiments operate in a data center network for multicast traffic in a live video production system. It is to be understood that this is only an example and that the embodiments described herein may be implemented in different types of networks to manage any type of content.

Referring now to the drawings, and first to FIG. 1, an example of a network in which embodiments described herein may be implemented is shown. For simplification, only a small number of nodes (network devices) are shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network.

Figure 3:
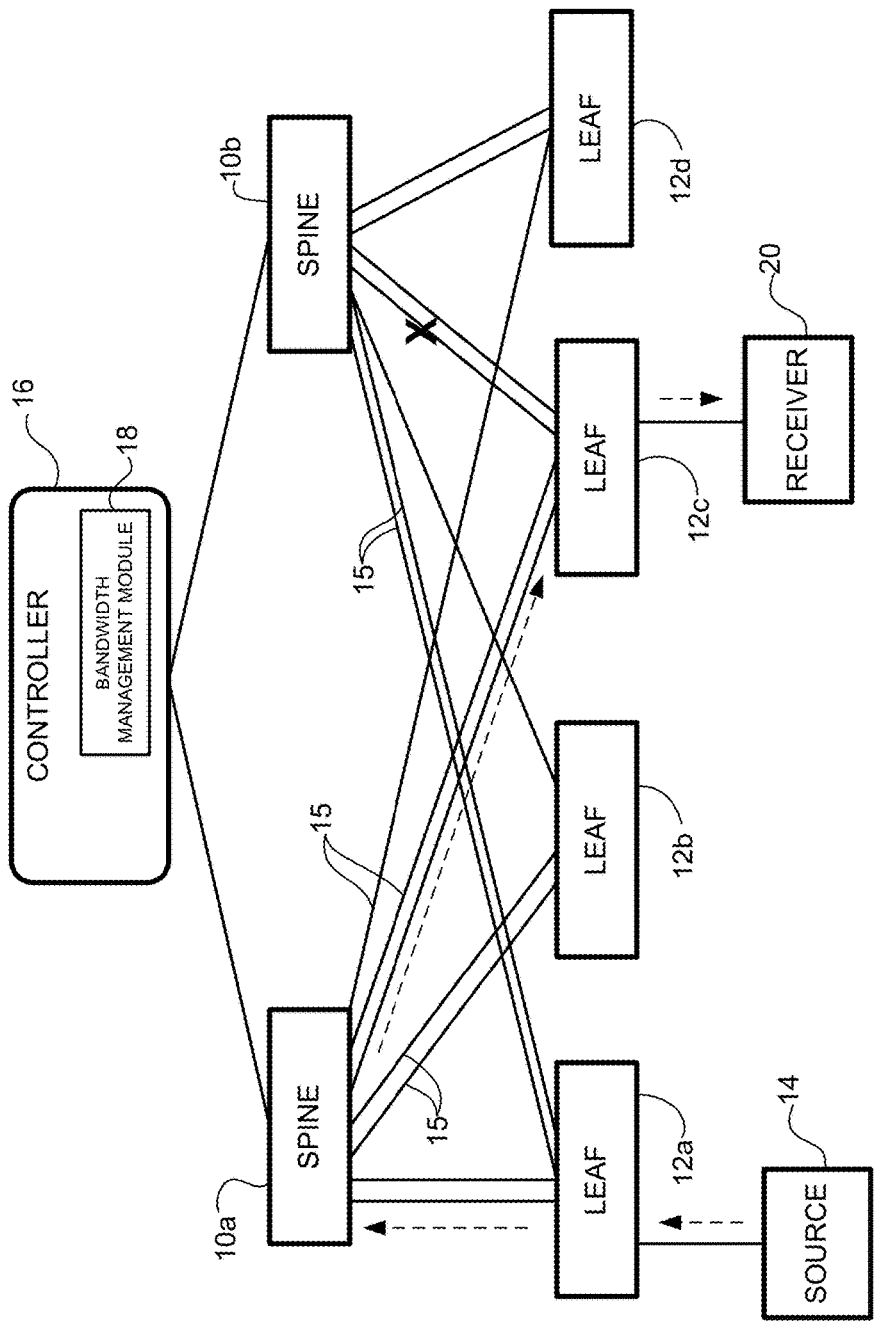
FIG. 3 illustrates bandwidth management in the network of FIG. 1.

In one embodiment, the network comprises a non-blocking IP (Internet Protocol) network fabric (e.g., fabric/nodes can handle all the bandwidths, at the same time, at full capacity). In the example shown in FIG. 1, a network fabric comprises a plurality of spine nodes 10a, 10b and leaf nodes 12a, 12b, 12c, 12d. The leaf nodes may be in communication with one or more sources (hosts) 14. The leaf nodes 12a, 12b, 12c, 12d are connected to the plurality of spine nodes 10a, 10b via a plurality of links 15. In one example, every lower-tier node is connected to each of the top-tier nodes. As shown in FIG. 3, each leaf node 12a, 12b, 12c, 12d is connected to each of the spine nodes 10a, 10b and is configured to route communications between one or more sources 14 and other network elements. Each leaf node may be in communication with any number of hosts (e.g., sources 14, receivers 20 (FIG. 3)). Any number of links 15 may be used to connect the leaf and spine nodes. For example, as shown in FIG. 1, spine 10a is connected to each of the leaf nodes 12a, 12b, and 12c via two links 15, and to leaf 12d with only one link. Spine 10b is connected to each of the leaf nodes 12a, 12c, and 12d via two links, and to leaf 12b with only one link. One or more links 15 may operate as an uplink for transmitting data from leaf to spine, a downlink for transmitting data from spine to leaf, or both uplink and downlink. The term "link" as used herein may refer to one or more uplinks, downlinks, link group, or any other communication pathway that may exist between spine nodes, leaf nodes, or any network nodes.

The spine nodes 10a, 10b and leaf nodes 12a, 12b, 12c, 12d may be switches, routers, or other network devices comprising network switching or routing elements configured to perform forwarding functions (e.g., L2, L3, or L2/L3 devices). The leaf nodes may be implemented, for example, as switching elements (e.g., Top of Rack (ToR) switches) or any other network element. One of the leaf nodes may be a border leaf connected to an edge device (e.g., router) located in an external network (e.g., Internet/WAN (Wide Area Network)). The border leaf may be used to connect any type of external network device or service (e.g., firewall, router port, etc.) to the fabric. The host 14 may have instantiated thereon one or more virtual switches for hosting one or more virtual machines. The network may include any number of physical servers hosting any number of virtual machines. The host may also comprise blade/physical servers without virtual machines.

The spine nodes 10a, 10b and leaf nodes 12a, 12b, 12c, 12d may comprise any number of uplink and downlink ports operable to support connectivity at various transmission rates (e.g., 1, 10, 25, 40, 50, 100 Gbps (gigabit per second), or any other port configuration). The nodes may, for example, run a platform designed for a programmable fabric/network.

The network includes a network controller 16 that has complete visibility of the network and is operable to allocate flows to various upstream and downstream links 15 based on bandwidth availability (capacity) on those links. In one or more embodiments, the controller 16 includes a path selection and bandwidth management module 18 that is configured to orchestrate and manage the network fabric (e.g., data center network fabric). The controller 16 may be a physical device or a virtual element, and may be located at one network device or distributed throughout the network at different network devices in communication with one another or a central controller, for example. It may also be located or integrated with the application.

The controller 16 may learn the network topology including all of the uplink and downlink capacities between spine nodes 10a, 10b and leaf nodes 12a, 12b, 12c, 12d, using a topology discovery mechanism (e.g., CDP (Cisco Discovery Protocol), LLDP (Link Layer Discovery Protocol), etc.). The controller 16 or other network device may use information gathered from packets transmitted on the network to identify locations of sources and receivers, switches (e.g., spine nodes, leaf nodes) or any other network device. The controller may also learn the capacity of all of the uplinks and downlinks using any available programmatic API (Application Program Interface) such as Nexus API, NetConf, or any other suitable means. The controller 16 may communicate with the leaf nodes via one or more spine nodes or directly with the leaf nodes.

In one or more embodiments, proactive and automatic end-host discovery is used to minimize bring-up time into fabric. In one example, the presence of a host (source 14, receiver 20, source/receiver) may be detected on a connected leaf source when an ARP (Address Resolution Protocol) request is received by a corresponding switch, as described further below with respect to FIG. 7. The controller 16 may be notified when any significant topology changes occur (e.g., host migration, link or node failure, logical error, change in bandwidth), as described further below with respect to FIGS. 7 and 13. The network controller 16 thus has a complete view of the network topology and available bandwidth at all times.

In one or more embodiments, when a new flow is created (e.g., from source 14 in FIG. 1), the controller 16 makes a note of the flow and associated characteristics and bandwidth requirements. The controller 16 may learn of the new flow, for example, by the leaf node 12*a* recognizing the new flow and notifying the controller, or the controller being informed by an application using a NB (North Bound) API. The flow may be identified, for example, using flow-level information (e.g., 5-tuple; source IP address, destination IP address, port number, protocol, multicast group, etc.). As described below, various flow policies may be defined.

The flow may comprise any type of data (e.g., video, images, graphics, text, Web pages, audio, or other data or combination thereof). The data (content) transmitted from the source 14 may be encrypted, compressed, or encoded according to any format. The content source may be, for example, a server (e.g., origin server, group of servers) that stores the data locally or obtains the data from another server or media source via another network, satellite, cable, a live media source, or any other communication device or it could be the media source itself (e.g., camera).

Figure 8A:
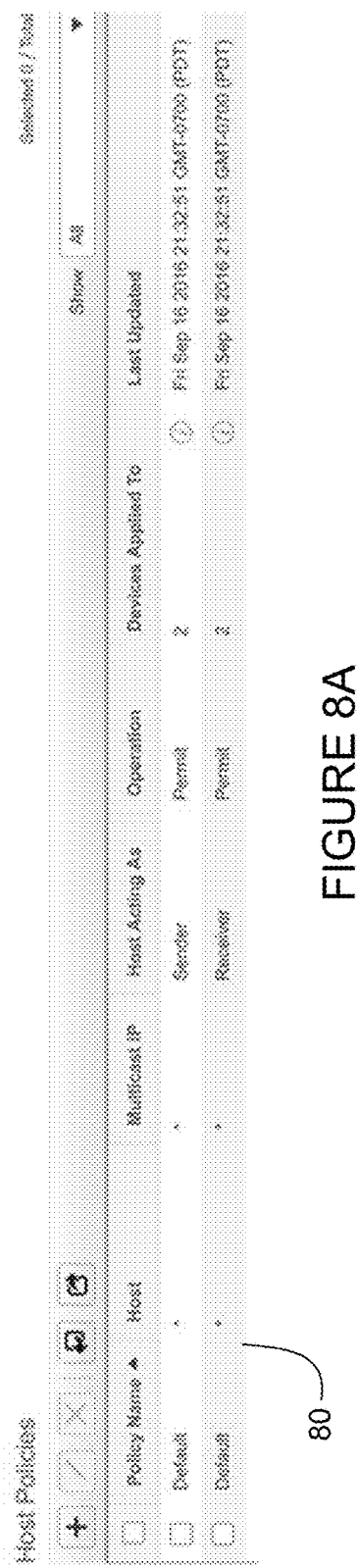
FIG. 8A illustrates an example of host policies displayed on a graphical user interface.
Figure 8B:
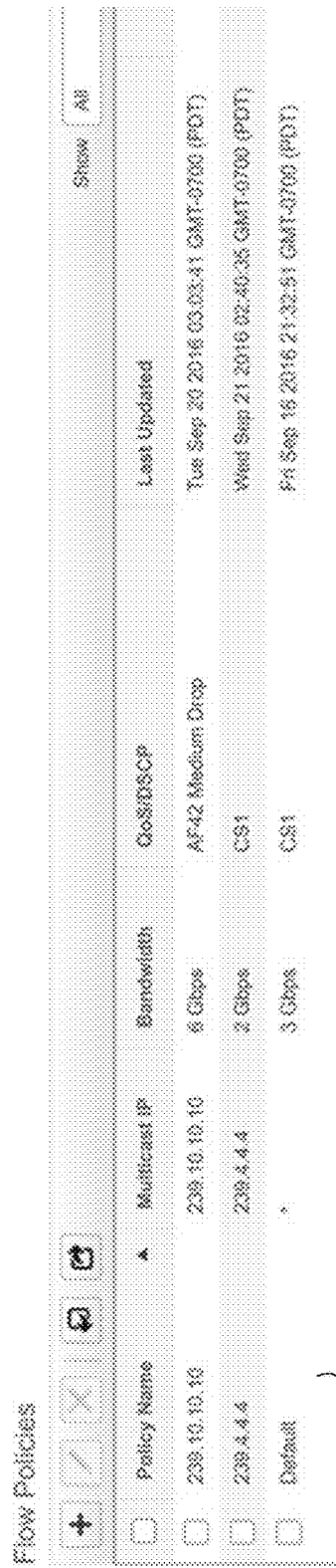
FIG. 8B illustrates an example of flow policies displayed on a graphical user interface.

In one embodiment, the network controller 16 may select a spine (e.g., spine 10*b* in the example shown in FIG. 1) and an uplink 17 to the spine for the flow and program the network (e.g., switch (leaf node 12*a*)) to send the flow up to the spine. In selecting the spine and uplink 17, the controller 16 may take into account the number of spines available, number of uplinks to each spine, usage of various uplinks and downlinks, etc. The network controller 16 balances the flows across the spines 10*a*, 10*b* and uplinks. In one example, the controller 16 may push the flow to the spines 10*a*, 10*b* in a round robin manner. As described below with respect to FIGS. 8A and 8B, default network policies (e.g., host policies, flow policies) may be used for spine node selection, link selection, and bandwidth management. Examples of bandwidth management are described further below with respect to FIG. 9.

In the example shown FIG. 1, the controller 16 selects spine 10*b* to receive flow from the source 14 and uplink 17 to transmit the flow. The flow is transmitted from leaf node 12*a* to spine node 10*b* and dropped at the spine 10*b* since at this time there are no listeners (receivers) for the flow. In this example, the spine is selected upon identifying the flow, for optimization purposes. By sending the flow to the spine 10*b* before requests are received for the flow, the system becomes more responsive because at receive time it needs to program less switches.

In another embodiment, the network controller 16 may wait to select a spine 10*a*, 10*b* or to transmit a flow to the spine until the flow is requested at one of the leaf nodes 12*a*, 12*b*, 12*c*, 12*d*.

Figure 2:
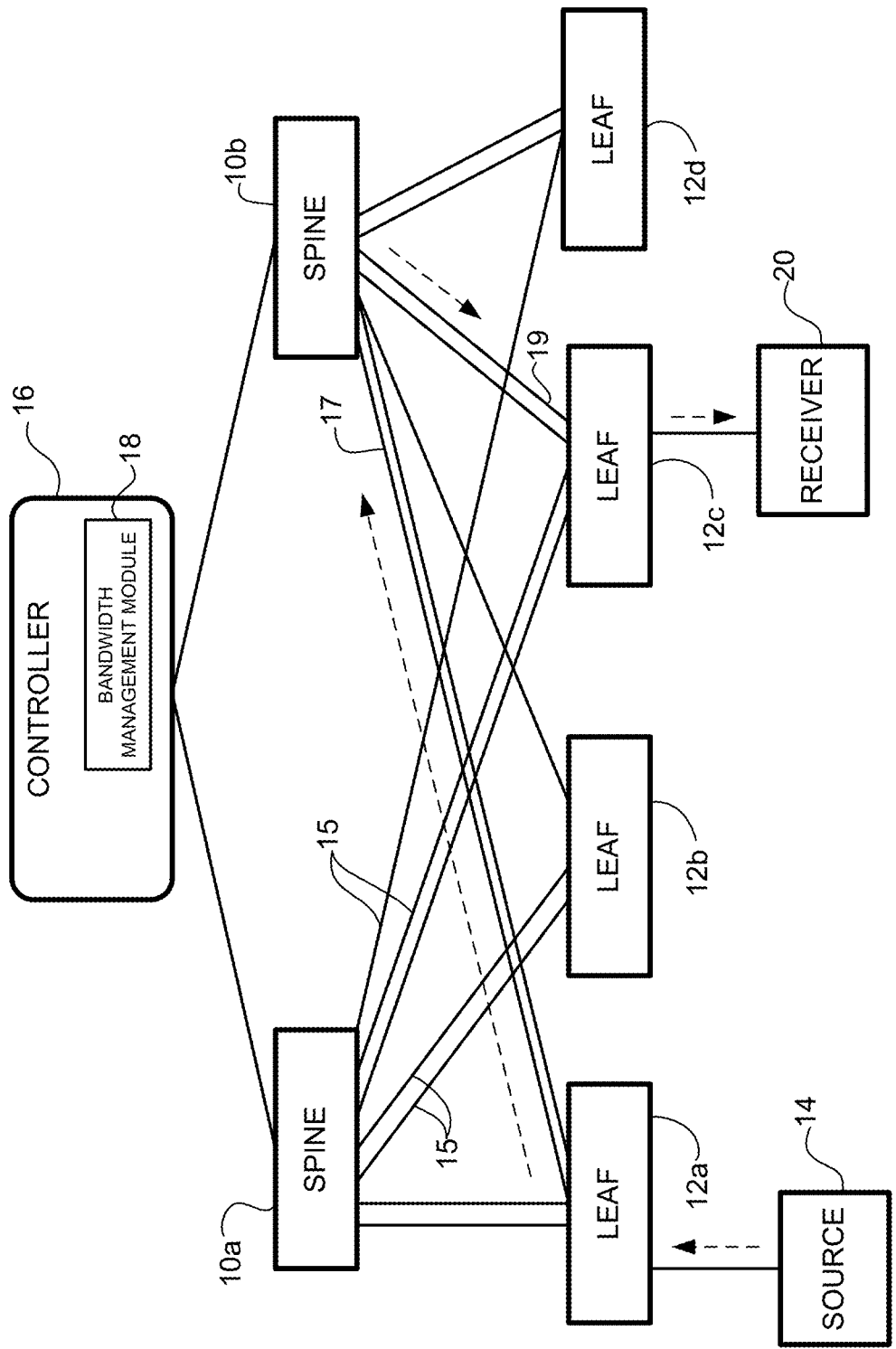
FIG. 2 illustrates transmittal of a flow from a source in the network of FIG. 1.

FIG. 2 illustrates a receiver 20 in communication with leaf node 12*c*. The receiver 20 may be any network device operable to request and receive content from the source 14. For example, the receiver 20 may comprise a desktop computer, laptop computer, set-top box, mobile phone, personal digital assistant, tablet, video switcher, monitor, or any other multimedia device, and the like. The data path between the source 14 and receiver 20 may include any number or type of intermediate nodes (e.g., switches, routers, or other network devices), which facilitate passage of data between the endpoints (source, receiver). The receiver 20 may request the content using any suitable message or protocol. In one example, the receiver transmits an IGMP (Internet Group Management Protocol) join message indicating its interest in joining a multicast group for receiving content from the source 14. In another example, an application may use the NB API of the controller to ask the flow to be routed to the receiver. As described below, host policies may be defined to manage receiver admission controller.

As shown in FIG. 2 and described below, when the receiver 20 requests the flow from source 14, the controller 16 extends the flow from the spine 10*b* in which the flow resides to the destination leaf 12*c* (egress node) on downlink 19.

The request for flow (e.g., IGMP join), transmitted from the receiver 20 is received at the controller 16 from the egress switch (leaf 12*c*). The controller 16 may also be notified of the request by an application using a NB API, for example. The controller 16 first identifies the spine 10*b* that has the flow, and then checks to see if there is capacity in the downlink (one or more links) from the spine 10*b* to the specific egress leaf node 12*c*. In the example shown in FIGS. 1 and 2, spine 10*b* was selected to receive the flow from the source 14. If the controller 16 determines that there is capacity in downlink 19 from spine 10*b* to leaf 12*c*, the controller programs the flow to be routed to the egress leaf node 12*c*, which is then transmitted to the receiver 20 in response to the join request or the API call.

When the capacity is exhausted in the downlink 19 from spine 10*b* to destination leaf 12*c*, as illustrated in FIG. 3, the controller 16 may duplicate the flow from the source leaf 12*a* to a different spine and then extend it to the destination leaf using a different downlink. For example, if the downlink from spine 10*b* to leaf 12*c* does not have sufficient capacity for the flow, the controller 16 may send another copy of the flow from the source leaf 12*a* to another spine node (e.g., spine node 10*a* in FIG. 3) from which downlink capacity is available, to the egress leaf node 12*c*.

Various parameters may be used to select the new spine. In the case of a multicast system with most of the flows being sent to multiple destinations, a system bound by downlink bandwidth and uplink capacity to replicate the flow would typically not be an issue and should not create underutilization. There should be sufficient bandwidth for the flow to be copied to the other spine since in a multicast environment the numbers of sources 14 are typically at least half of the receivers 20. The controller 16 may provide further optimization by removing the flow from an earlier spine if not utilized when a copy to another spine is made without impacting the original receiver.

When a failure occurs such as link down, the controller 16 may remove the link from its capacity, stop any new admission to that link, and then re-establish the existing flows in the failed link using other links. To allow this to occur, the fabric should only admit flows that do not create oversubscription of links. If all of the flows cannot be accommodated, an application may be notified so that it can prioritize the flows with the NB API, for example. This allows for self-healing of a blocking failure. While there is a certain downtime for a few flows during this self-healing, a redundant design with two network fabrics and use of SMPTE 2022-7, for example, in this environment may ensure that the video production is not impacted.

In the period when flows are impacted, the controller 16 may also provide detailed visibility into the flows, interfaces, and all other aspects of the impact. This may be provided in a presentation layer if the controller supports one, or through the NB API to the application, for example.

It is to be understood that the network devices and topologies shown in FIGS. 1, 2, and 3 and described above are only examples and the embodiments described herein may be implemented in networks comprising different network topologies or network devices, or using different protocols or processes, without departing from the scope of the embodiments. For example, the network may comprise any number of tiers of nodes (layer, level, hierarchy), and any number of nodes at each tier. The network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 4:
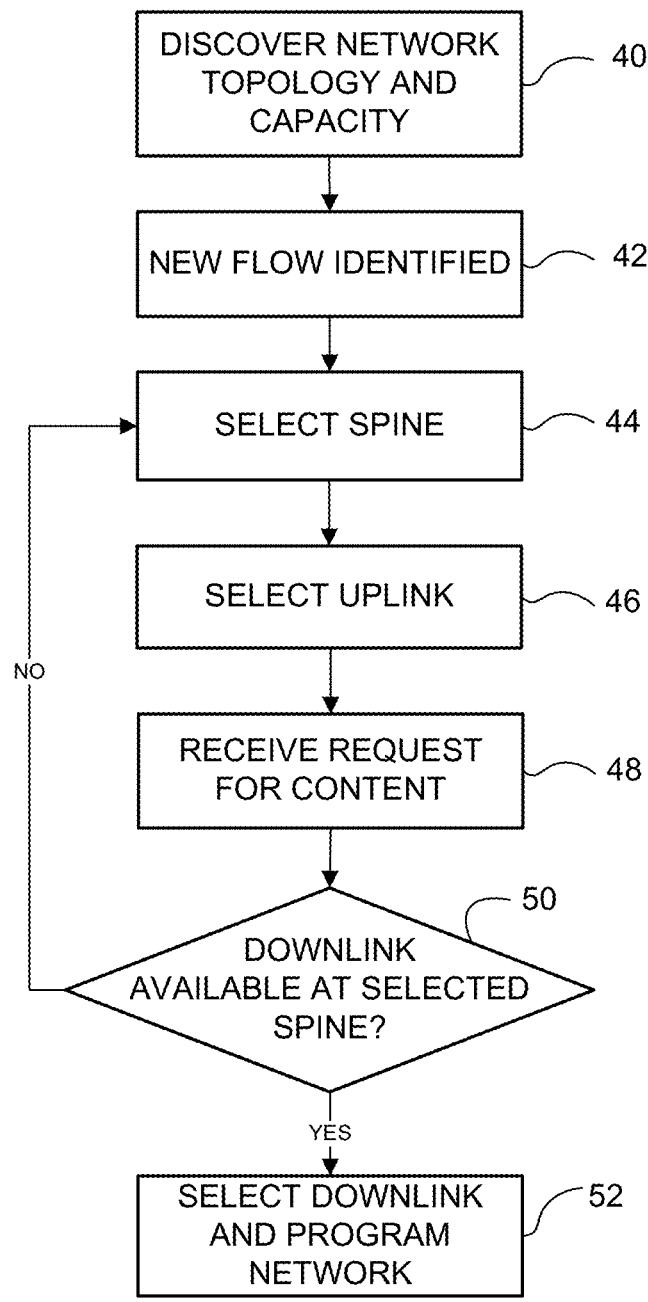
FIG. 4 is a flowchart illustrating an overview for bandwidth management at a network controller, in accordance with one embodiment.

FIG. 4 is a flowchart illustrating an overview of a process for bandwidth management in a non-blocking fabric, in accordance with one embodiment. At step 40, network topology and link capacities are discovered at the controller 16 (FIGS. 1 and 4). The link capacities include uplink capacities for links transmitting flows from the leaf nodes to the spine nodes and downlink capacities for the links transmitting the flows from the spine nodes to the leaf nodes. As described above, the controller 16 may use any type of discovery mechanism including CDP or LLDP. A new flow is identified at the controller 16 (e.g., through a leaf node recognizing the new flow or from an application) (step 42). The controller 16 also notes the associated characteristics and bandwidth requirements of the flow. In one embodiment, the controller 16 then selects the spine node (e.g., 10*b* in FIG. 1) and uplink 17 to the spine for the flow and programs the switch (e.g., 12*a* in FIG. 1) to send the flow up to the spine (steps 44 and 46). The flow is dropped at the spine 10*b* if there are no receivers for the flow.

The controller 16 receives a request for the flow from receiver 20 (step 48) (FIGS. 2 and 4). In one embodiment, the controller 16 may wait to select a spine and uplink or wait to transmit a flow to the spine, until the flow is requested at one of the leaf nodes. In this case, step 48 may occur before step 44. Upon receiving a request for the flow at the controller 16, the controller checks whether there is capacity in the downlink 19 from the spine 10*b* (selected at step 44) to the egress leaf node 12*c* in communication with the receiver 20 (step 50). If the controller 16 determines that there is sufficient capacity in the downlink from spine 10*b* to leaf 12*c*, the controller selects the downlink 19 and programs the flow to be routed to the leaf node, which is then transmitted to the receiver 20 in response to the join request (step 52). If there is not sufficient capacity in the downlink from the spine 10*b* to the destination leaf 12*c*, the controller 16 may select a different spine and uplink (e.g., spine 10*a* in FIG. 3) (steps 50, 44, and 46) and duplicate the flow from the source leaf 12*a* to the spine 10*a* and extend it to the destination leaf 12*c* using a different downlink.

It is to be understood that the process shown in FIG. 4 and described above is only an example and that steps may be added, modified, removed, or reordered, without departing from the scope of the embodiments.

Figure 5:
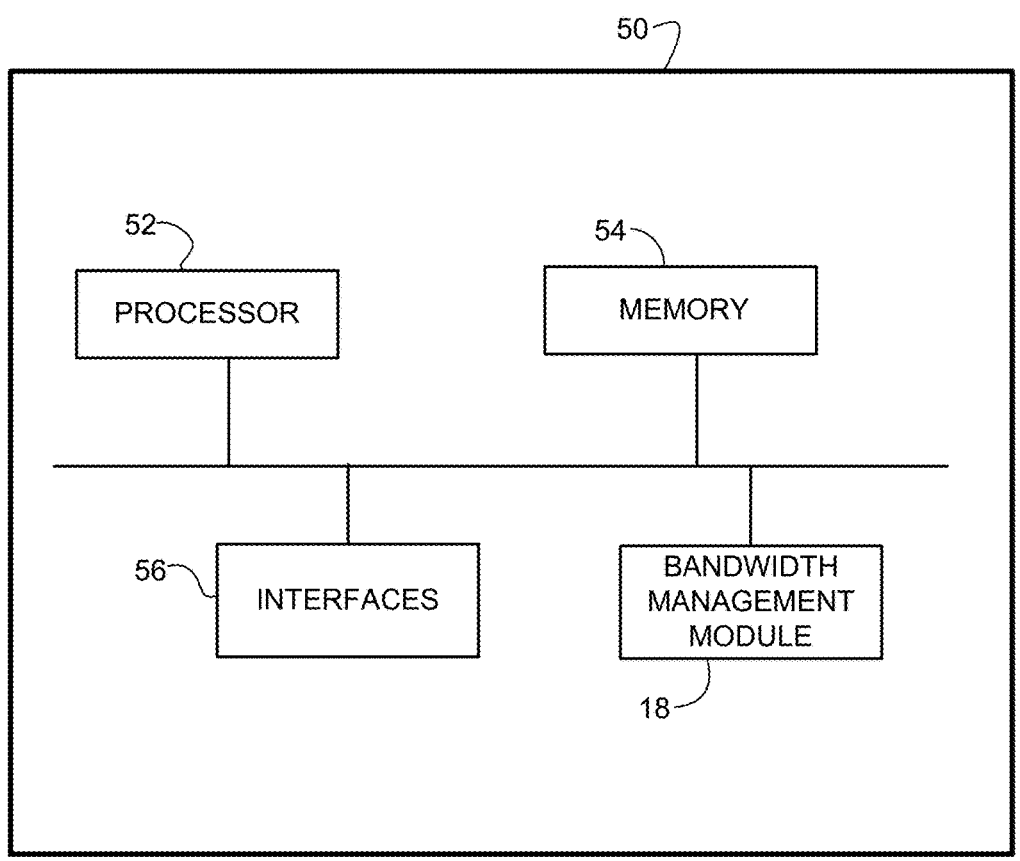
FIG. 5 depicts an example of a network device useful in implementing embodiments described herein.

FIG. 5 illustrates an example of a network device 50 (e.g., controller 16 in FIG. 1) that may be used to implement the embodiments described herein. In one embodiment, the network device is a programmable machine that may be implemented in hardware, software, or any combination thereof. The network device includes one or more processor 52, memory 54, network interfaces 56, and bandwidth manager module 18.

Memory 54 may be a volatile memory or non-volatile storage, which stores various applications, operating systems, modules, and data for execution and use by the processor. For example, bandwidth management module (e.g., code, logic, etc.) may be stored in memory. The device 50 may include any number of memory components.

Logic may be encoded in one or more tangible media for execution by the processor 52. For example, the processor 52 may execute codes stored in a computer-readable medium such as memory 54. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device 50 may include any number of processors 52. In one example, the computer-readable medium comprises a non-transitory computer-readable medium. The logic may be operable to perform one or more steps shown in the flowchart of FIG. 4.

The network interfaces 56 may comprise any number of interfaces (linecards, ports) for receiving data or transmitting data to other devices. The network interface may include, for example, an Ethernet interface for connection to a computer or network. The network interfaces 56 may be configured to transmit or receive data using a variety of different communication protocols. The interfaces 56 may include mechanical, electrical, and signaling circuitry for communicating data over physical links coupled to the network.

It is to be understood that the network device 50 shown in FIG. 5 and described above is only an example and that different configurations of network devices may be used. For example, the network device may further include any suitable combination of hardware, software, processors, devices, components, or elements operable to facilitate the capabilities described herein.

The following provides examples of implementation of the embodiments described above. It is to be understood that these are only examples and the embodiments described herein may be utilized in different implementations or for different uses without departing from the scope of the embodiments.

Figure 6:
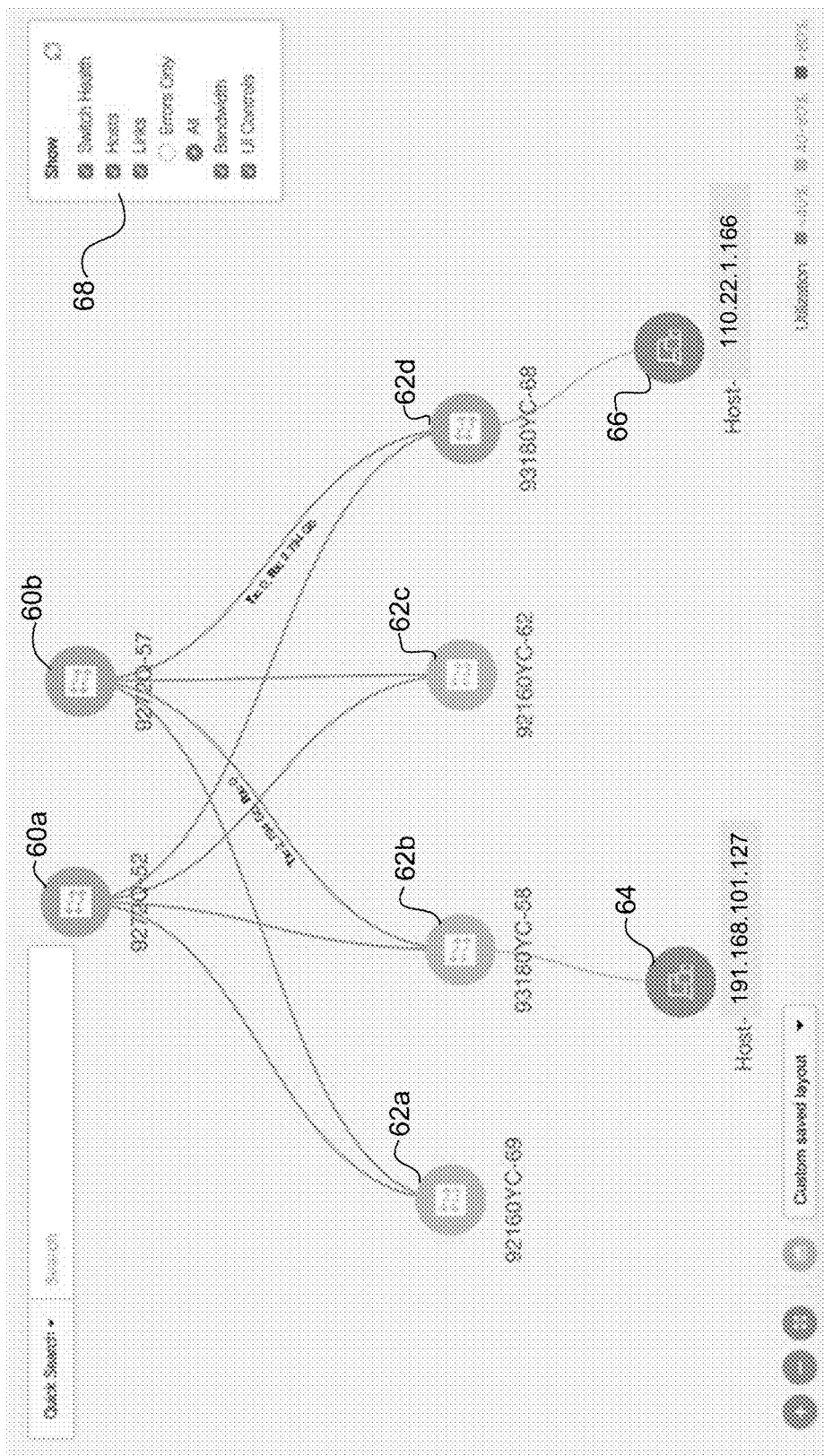
FIG. 6 illustrates an example topology displayed on a graphical user interface.

FIG. 6 illustrates an example of a topology in which proactive and automatic end-host discovery may be used to minimize bring-up time into the fabric. The example shown in FIG. 6 includes two spine nodes 60*a*, 60*b* and four leaf nodes 62*a*, 62*b*, 62*c*, 62*d*. Leaf node 62*b* is in communication with host 64 (191.168.101.127) and leaf node 62*d* is in communication with host 66 (110.22.1.166). The hosts 64, 66 may be, for example, connected in the fabric as a source/input (e.g., camera/mic) or destination/output (e.g., video mixer) device. The host role is determined once it starts to send or receive traffic. There may be any number of hosts participating in a single fabric. The hosts may be auto-discovered so that an end-user does not need to keep track of them and configure them in fabric.

The example shown in FIG. 6 may be presented on a graphical user interface (GUI) to provide visualization of the fabric for one or more users. The topology display may show switch-switch and switch-host connectivity and link bandwidth reservation, as described further below.

Figure 7:
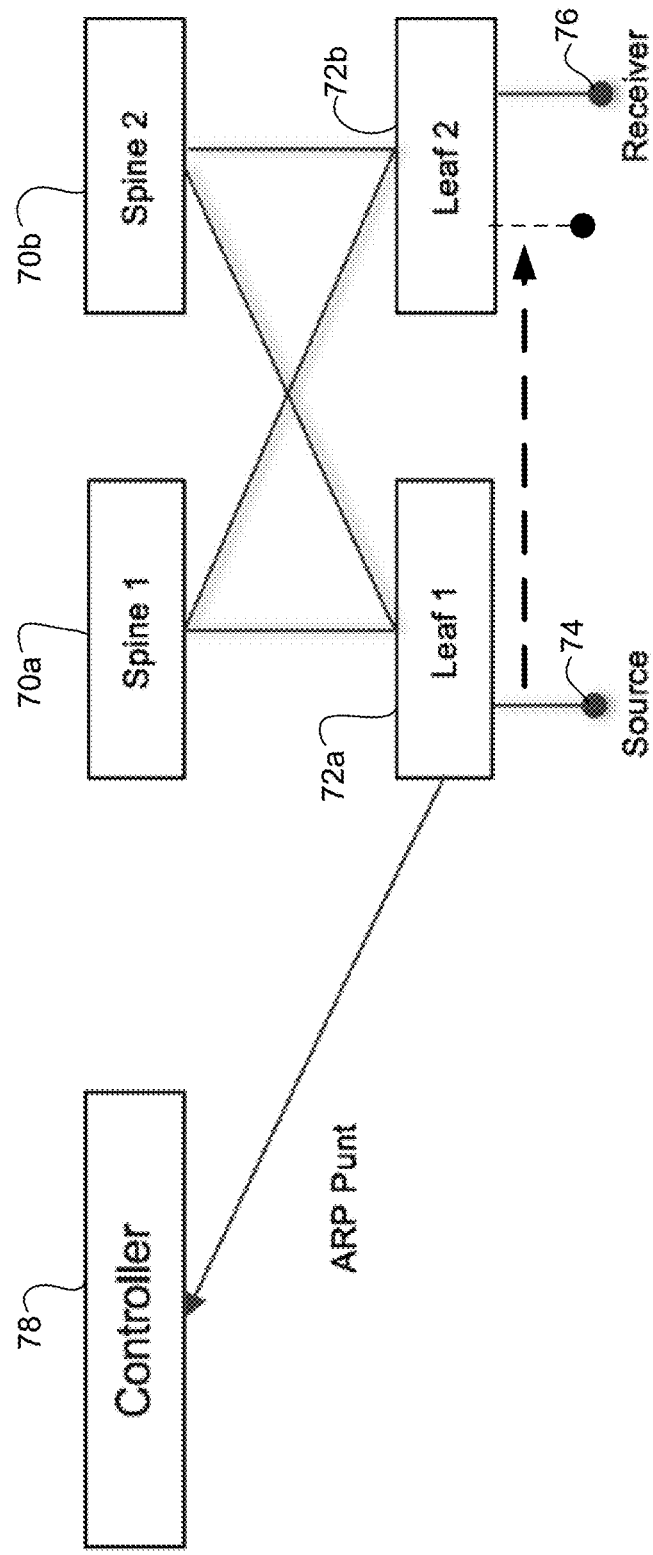
FIG. 7 illustrates an example of migration of a source between leaf nodes.

In the example shown in FIG. 7, source 74 is initially in communication with leaf 1 (72a), receiver 76 is in communication with leaf 2 (72b), and both leaf nodes are in communication with spine nodes 70a, 70b. As previously noted, the presence of a host may be detected on a connected leaf source when an ARP request is received by a corresponding switch. In this example leaf 1 propagates the ARP request (ARP punt) to controller 78 and passes key attributes of host and connectivity information (e.g., IP and MAC (Media Access Control) address of switch and host interface of switch where presence of host is detected). The controller 78 may update topology data with host information, which may be used for topology computation, policy application, etc. This eliminates the need for the end-user to track senders/receivers, and allows the controller 78 to be ready to apply policies for the host 74, 76 before it actually starts sending or receiving traffic.

Since end-users may move senders and receivers within the fabric, it is important for the controller 78 to have up-to-date host connectivity information. In the example shown in FIG. 7, source 74 moves from leaf 1 (72a) to leaf 2 (72b) following actions that take place in the fabric. Leaf 2 detects the presence of a new source and communicates it to the controller 78 (e.g., as described above). The controller 78 detects that it has received updated information for the same source 74 and updates its host topology database. Subsequently, ARP for the host (source 74) times out on leaf 1 (switch 72a). Leaf 1 communicates the time out to the controller 78, which provides confirmation of the host migration to the controller. The controller 78 may also send out commands to clean up host and policy configuration to leaf 1 for the host (source 74).

As previously described, various policies may be used by the controller 78 in selecting uplinks, downlinks, spine nodes, or for use in bandwidth management. In one embodiment, default network policies may be used to function without user intervention. These may include control and host policies, for example. Default policies may alleviate the burden of defining the behavior for each host and flow. In one or more embodiments, a user may choose to work with default policies so that the fabric may support broadcasting without user intervention.

Host policies may be used to manage source/receiver admission control. For example, as shown in table 80 in FIG. 8A, separate defaults may be defined for sources and receivers. The default may be blacklist (i.e., explicitly deny individual source to send/receive to all or set of multicast groups). Whitelist options may also be used, in which a user explicitly admits desired hosts in the fabric.

A user may also manage bandwidth and QoS characteristics per flow level. However, if an entire fabric is dedicated to audio or video, it may be preferred to use a global default. The controller may define fabric level characteristics for simplicity, which may be overridden for certain flows, if desired. In one embodiment, finer granularity may be used per host and flow policy definition for admission control, variable bandwidth, and QoS. For example, as shown in table 82 of FIG. 8B, a host may be restricted to certain multicast groups. A single host may act as both a sender and receiver and a separate set of policies may be applied on a host based on its role as either a sender or receiver. Global default of bandwidth and QoS for a host may be further customized by defining individual flow policies.

In one or more embodiments, incremental policy updates may be applied. For example, in an operating network, a user may choose to upgrade or downgrade video/audio quality resulting in a change in streaming bandwidth requirement. Also, admission control may be updated. The controller may support editing of individual host and flow policies to accommodate these changes. For example, the controller may compute delta policies without impacting any other active flows.

Referring again to FIG. 6, the following describes an example of bandwidth management. In this example, host 64 is a sender and host 66 is a receiver. In one embodiment, delayed path stitching may be used for optimized bandwidth usage. For example, host 64 may start streaming data into the fabric via connected leaf 62b. The leaf 62b notifies the controller to admit the flow by passing multicast group information. Host 66 may be interested in the flow, but may not yet be online requesting the stream. As the controller has a fabric-wide view, it does not allocate any uplink for host 64 to transmit data into the fabric. However, it may log the request. When host 66 comes online, the controller may then stitch the path. As soon as the last receiver for a given flow leaves, the controller may free the bandwidth. The fabric-wide view may also support senders or receivers coming online. If the receiver comes online first, the controller may remember the intent and stitch the flow as soon as the sender comes online.

The following describes an example of effective path selection and bandwidth reservation for a non-blocking fabric. As shown in FIG. 6, host 66 may receive flow from host 64 via spine node 60a or spine node 60b. As previously described, the controller discovers all connect link capacities as part of the initial switch discovery. When the controller computes the path, it factors in current allocations of uplinks (links between spine and leaf switches). The controller may first take into account currently allocated flows/bandwidth between sender leaf 62b and available spine nodes 60a, 60b that are connected to the receive leaf node 62d. The controller may, for example, select the least busy spine (i.e., spine node that has a fewer number of allocated flows). It is possible that multiple links may be available between the selected spine and receiver leaf. Bandwidth computations may be used to select the least busy link out of available links. This allows for even distribution of flows and leverages the multiple spine design. As described above, there is no restriction as to the number of spine or leaf switches participating in the fabric.

In one example, a single source may send out multiple streams effectively using multiple multicast groups. In one embodiment, bandwidth algorithms may attempt to keep all streams for a given source on a single spine link rather than spreading streams from different sources to different links. This helps to restrict impact of physical link failure to a smaller number of senders. As described below, a course correction scheme may be used, however, it may introduce some latency.

Figure 9:
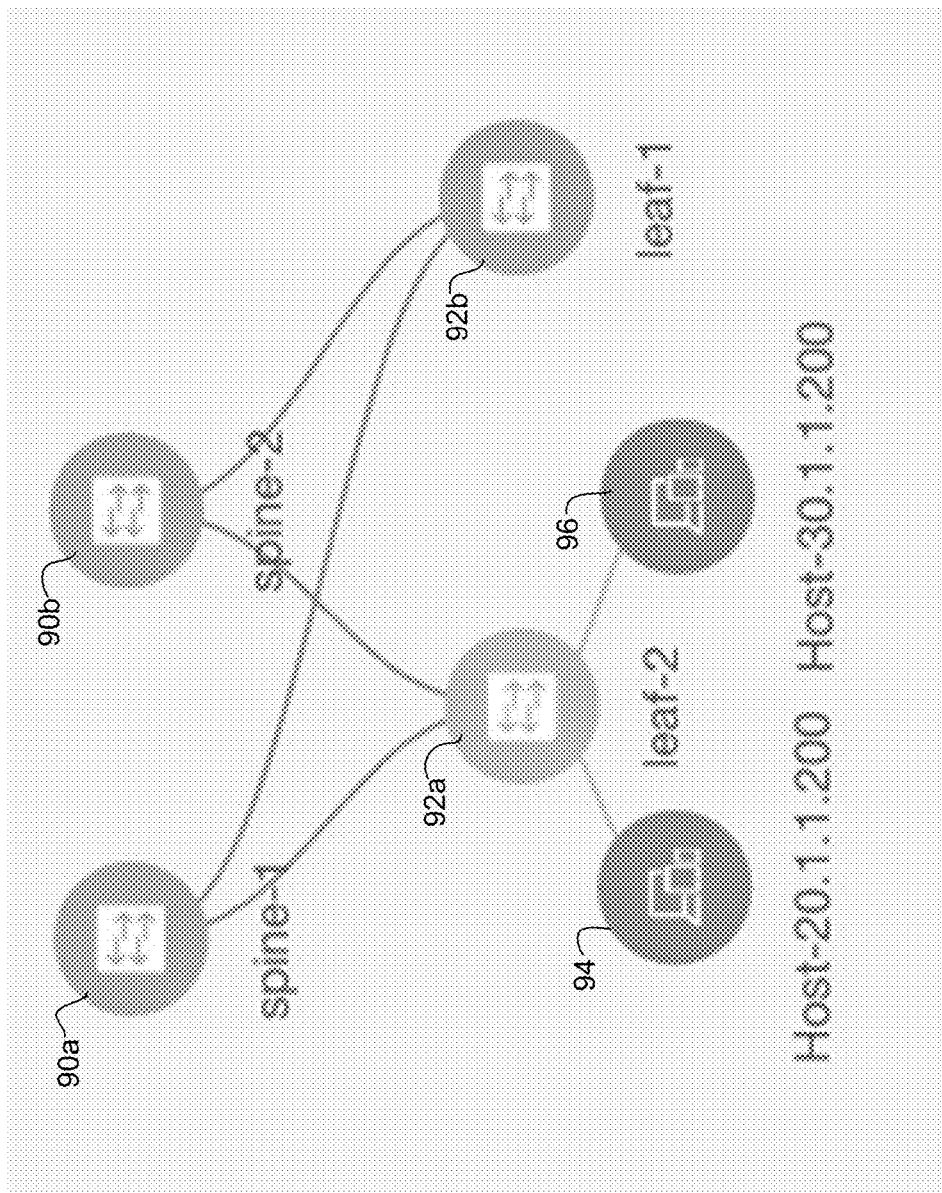
FIG. 9 illustrates an example topology with a source and receiver in communication with the same leaf node.

As described above, awareness of switch and host topology helps to optimize path selection. FIG. 9 illustrates an example fabric comprising two spine nodes 90a, 90b (spine-1, spine-2), and two leaf nodes 92a, 92b (leaf-1, leaf-2). In this example, a sender 94 and receiver 96 are in communication with leaf-2. If host 96 is interested in receiving a flow from host 94, the controller may realize that there is no need to allocate any uplink bandwidth. The controller may stitch the flow locally on leaf-2 to preserve fabric bandwidth. This may be an optional feature that can be configured in the controller. In some cases, it may be desired to switch through the spine nodes for predicable packet latency.

As previously noted, a graphical user interface may be provided for displaying topology, flow information, or other data. Referring again to FIG. 6, the graphical user interface may include selectable icons 68 that may be used to display network information. In one example, allocated bandwidth may be displayed as an overlay. When a large number of hosts are connected in a fabric, the display may be cluttered and a user may be interested in only one parameter such as visualization of flows on a given switch. In one embodiment, the user interface provides for selection of a single node for visibility into end-to-end flows at runtime. As shown in the example of FIG. 6, the user may select to view information on switch health, hosts, links (errors only, all links), bandwidth, or any combination of thereof.

Figure 10:
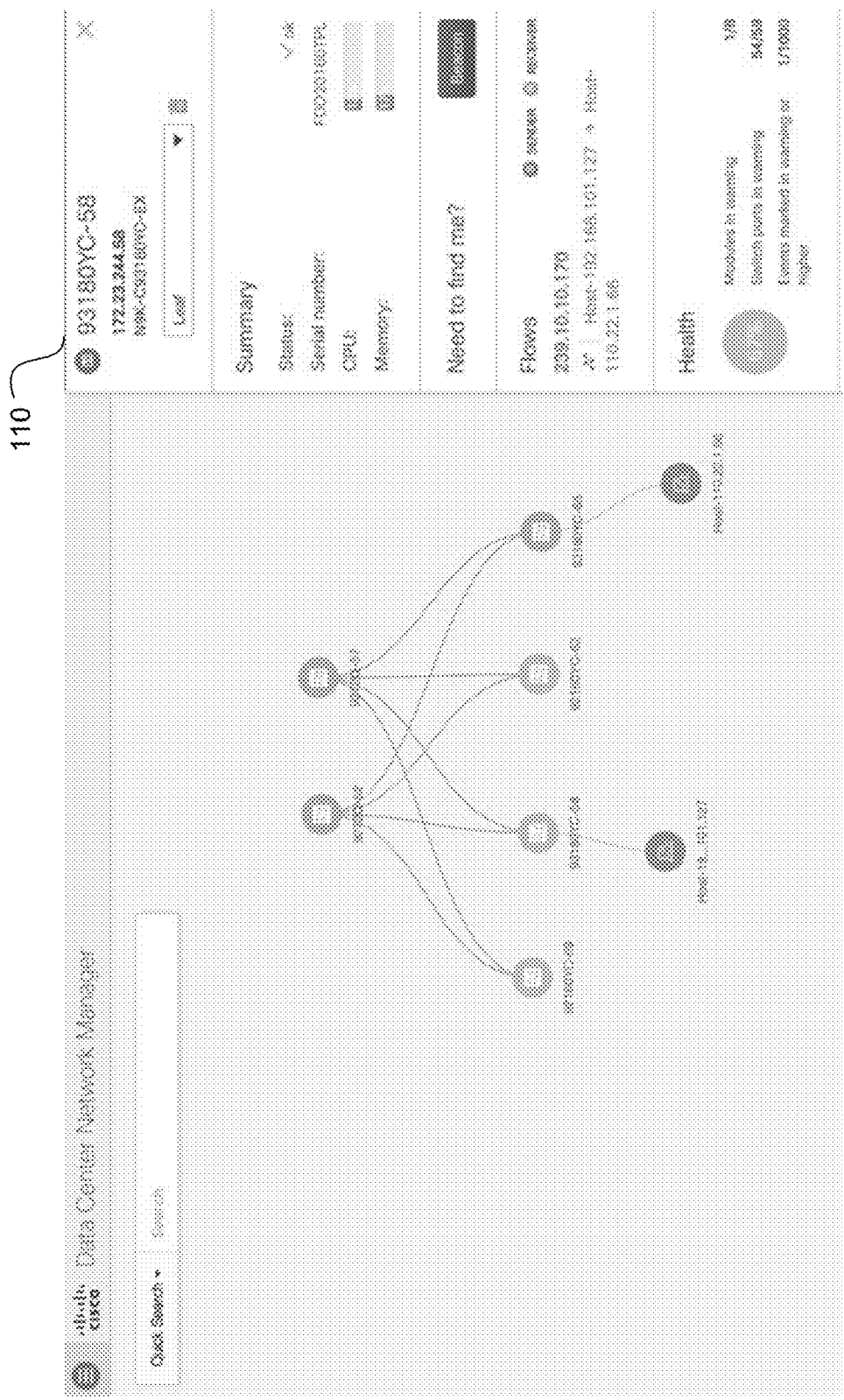
FIG. 10 illustrates am example of a dashboard on a graphical user interface.

FIG. 10 illustrates an example of a graphical user interface comprising a switch dashboard 110. In this example, leaf switch 93108YC-58 is selected. The switch dashboard displays all of the flows for connected senders and receivers. The dashboard may also display health and critical information for the switch, which may be used to assist in troubleshooting.

Figure 11:
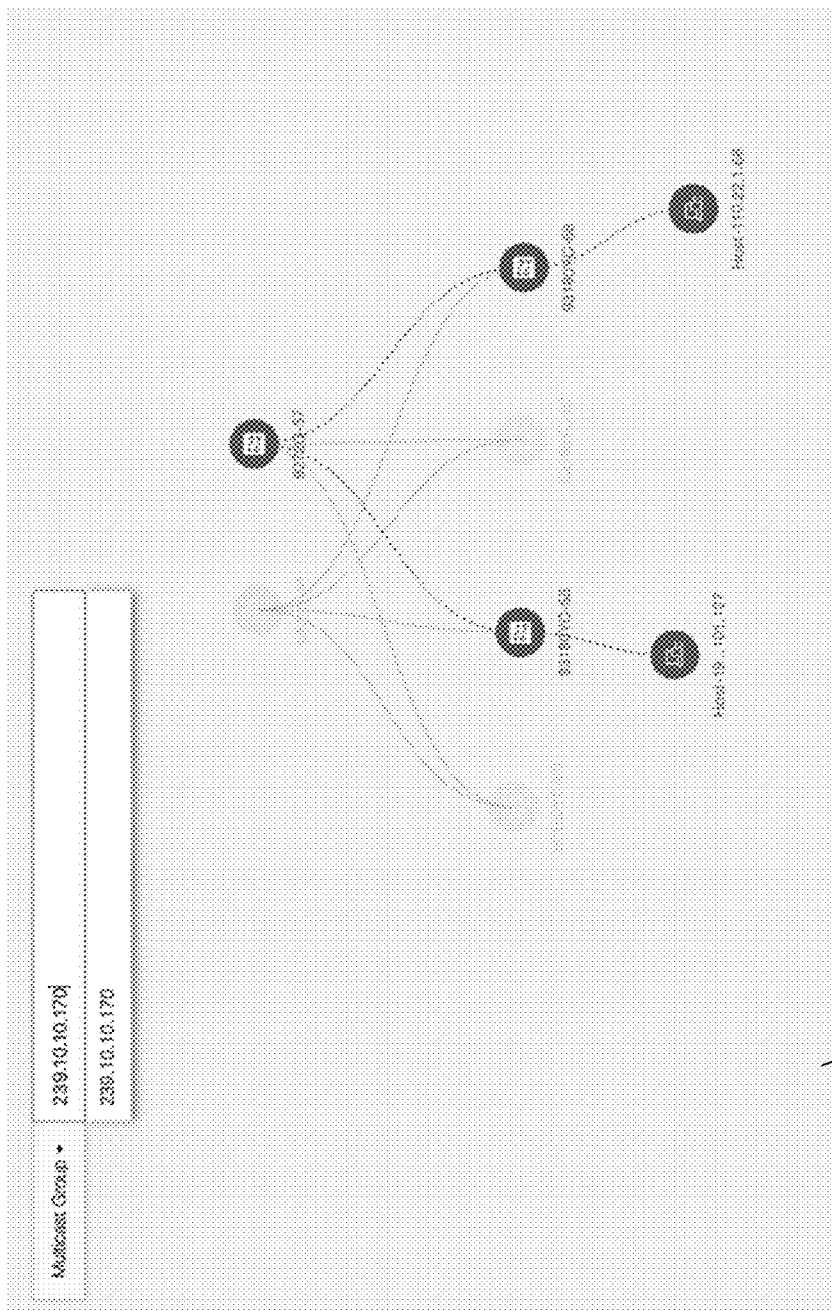
FIG. 11 illustrates an example of a connectivity display on a graphical user interface.

In the case of troubleshooting, a user may be interested in looking at runtime information for a given switch/host/multicast group. For example, a user may want to identify senders and receivers that are participating in a particular flow. FIG. 11 illustrates an example of an interface 111 that may be used for a host search (e.g., via name, IP address, MAC address) and provide flow visualization. In the example shown in FIG. 11, a user has entered a search for multicast group 239.10.10.170, which shows path connectivity among senders and receivers and involved switches, with the rest of the topology faded.

Figure 12:
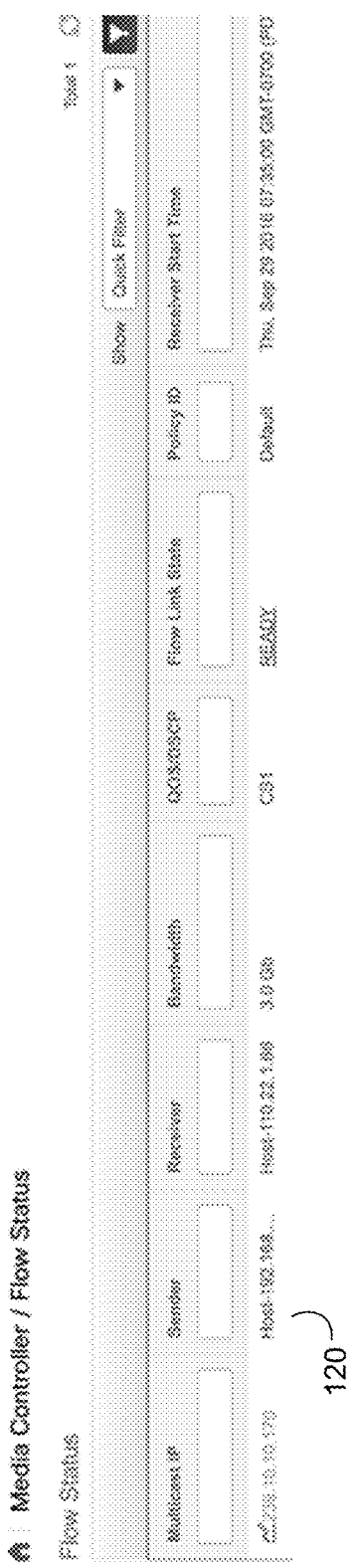
FIG. 12 illustrates an example of flow status on a graphical user interface.

Flow visibility may also be provided by tracking host and flow actions via an event log. For example, a runtime summary of all active flows may be useful in debugging and tracking active state of a fabric. Media control may provide a listing of all active flows. As shown in FIG. 12, a flow table 120 may be sorted or searched for a particular parameter. For example, clicking on a chart icon in the multicast IP column may provide historical data of actual bandwidth usage over a time period. This may help an end user in placement of senders and receivers.

In one embodiment, logs may be searched or sorted on various key parameters. For example, auditing is a feature used for accounting and debugging of flows. The controller may log critical data such as send/receiver, joins/leaves, admission control/denial of requests. An event log entry may also include a policy ID (identifier) for a policy that was enforced on a given record. Logs may be categorized based on severity, for example.

It is to be understood that the graphical user interface and tables shown in FIGS. 6, 8A, 8B, 10, 11, and 12, and described above are only examples and that other GUIs providing different information or comprising different formats may be used without departing from the scope of the embodiments.

In one or more embodiments, the controller may be configured for error handling. This may include physical errors (e.g., spine failure, leaf failure, link failure) or logical errors (e.g., insufficient available bandwidth, traffic limiting at source).

The controller may attempt to recover for physical failures and rebalance the traffic through flow migration. For example, on spine failure detection, the controller may identify impacted flows passing through the spine and determine if there are available uplinks and bandwidth available on remaining spines. Flows with higher QoS may be given priority during reallocation.

In the case of a link failure, the controller's job may be primarily to identify impacted flows. For example, if a receiver leaf goes down and there are flows that were requested only by that leaf node, the controller may stop streaming the corresponding sender into the fabric. This allows for freeing up of fabric bandwidth. If the leaf node comes back online, then flows may be reestablished by the controller.

An uplink failure may be handled as a subset of a spine failure. In the case of spine failures, multiple uplinks may be migrated, whereas link failure involves migration of flows for that link. As with other physical failures, detection is the first step, and then recovery.

Figure 13:
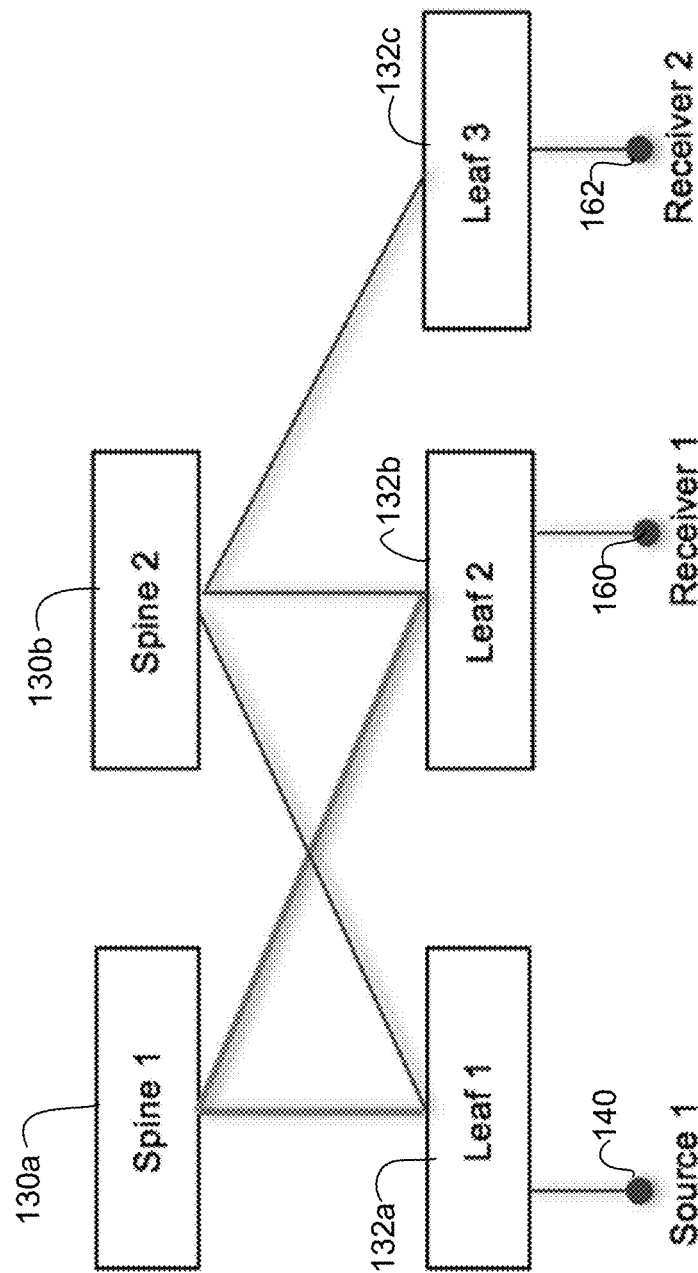
FIG. 13 illustrates an example of a topology comprising a logical error.

Logical errors may include insufficient available bandwidth on a receiver leaf to reach a spine node. For example, the controller may admit flow via a single uplink to the fabric. Two-tier design may be a full mesh (i.e., each leaf node connected to all spine nodes). In practicality, it is possible that a receiver may not be connected to all spines, as shown in the example of FIG. 13. The fabric shown in FIG. 13 comprises two spine nodes (spine 1) 130a, (spine 2) 130b, and three leaf nodes (leaf 1) 132a, (leaf 2) 132b, and (leaf 3) 132c. Leaf nodes 132a and 132b are each connected to both spine nodes 130a, 130b. Leaf 3 (132c) is only connected to spine 2 (130b). In this example, there is an active flow between source 1 (140) and receiver 1 (160) via spine 1. At a later time, receiver 2 is connected via leaf 3 and requests the flow from source 1. The controller may detect that there is no path between spine 1 and leaf 3 and replicate the same flow from leaf 1 to both spine 1 and spine 2. This condition may arise even in a full mesh fabric when uplink bandwidth is fully allocated and the controller is not able to establish a new flow.

In order to guarantee non-blocking (e.g., essentially non-blocking or close to zero loss) fabric, it may be important to police ingress streaming and watch that it stays within an allocated bandwidth defined by corresponding flow policy. Ingress rate limiting may be enforced at a switch (data plane) and all violations communicated to the controller. The controller may provide visibility into dropped counters and policy violations to the end user. This may be due to misconfiguration and as soon as the problem is rectified, streaming is resumed in the fabric.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   discovering at a network controller, a topology and link capacities for a network, the network controller in communication with a plurality of spine nodes and leaf nodes comprising routers or switches, said link capacities comprising uplink and downlink capacities for links between the spine nodes and the leaf nodes;

identifying at the network controller, a flow of content received from a content source connected to one of the leaf nodes and separate from the network controller;

selecting at the network controller, one of the spine nodes to receive the content flow from the leaf node based, at least in part, on said link capacities; and programming the network to transmit the content flow from the spine node to one of the leaf nodes in communication with a receiver requesting the content flow;

wherein each of the leaf nodes is directly connected to each of the spine nodes and wherein selecting the spine node comprises balancing the content flow across the plurality of spine nodes and uplinks transmitting flows from the leaf nodes to the spine nodes.

2. The method of claim 1 further comprising selecting an uplink for transmitting the content flow from the leaf node to the spine node.

3. The method of claim 1 further comprising selecting a downlink from the selected spine node to the leaf node in communication with the receiver for transmitting the content flow.

4. The method of claim 1 further comprising determining that a downlink from the selected spine node to the leaf node in communication with the receiver does not have capacity for the content flow and selecting another one of the spine nodes to receive the content flow and transmit the content flow to the leaf node.

5. The method of claim 1 wherein programming the network comprises programming the leaf node receiving the content flow from the content source to transmit the content flow to the selected spine node and programming the spine node to transmit the content flow to the leaf node in communication with the receiver.

6. The method of claim 1 wherein selecting the spine node comprises selecting the spine node upon identifying the content flow and wherein the content flow is dropped at the spine node when no receivers are requesting the content flow.

7. The method of claim 1 wherein selecting the spine node comprises balancing the content flow across the plurality of spine nodes and uplinks transmitting flows from the leaf nodes to the spine nodes.

8. The method of claim 1 further comprising receiving at the network controller, notification of a link failure and selecting a new one of the spine nodes to receive the content flow.

9. The method of claim 1 further comprising identifying a link failure and impacted flows.

10. The method of claim 1 wherein selecting the spine node comprises applying a default policy at the controller.

11. The method of claim 1 wherein the network comprises a non-blocking IP (Internet Protocol) network fabric.

12. An apparatus comprising:

a plurality of interfaces for communication with a plurality of spine nodes and a plurality of leaf nodes comprising routers or switches;

a processor for discovering a topology and link capacities for a network, identifying a flow of content received from a content source at one of the leaf nodes, selecting one of the spine nodes to receive the content flow and an uplink for transmitting the content flow to the selected spine node, programming the network to transmit the content flow from the spine node to one of the leaf nodes in communication with a receiver requesting the content flow; and memory for storing said topology and said link capacities, said link capacities comprising uplink capacities for links transmitting flows from the leaf nodes to the spine nodes and downlink capacities for the links transmitting the flows from the spine nodes to the leaf nodes;

wherein each of the leaf nodes is directly connected to each of the spine nodes and wherein selecting the spine node comprises balancing the content flow across the plurality of spine nodes and uplinks transmitting flows from the leaf nodes to the spine nodes.

13. The apparatus of claim 12 wherein the processer is further configured for programing the network to route the content flow to the selected spine node upon receiving a request from the receiver.

14. The apparatus of claim 12 wherein the processor is further configured to provide flow path visualization to a graphical user interface.

15. The apparatus of claim 12 wherein the processor is further configured to identify policy violations in the network.

16. The apparatus of claim 12 wherein the network comprises a non-blocking IP (Internet Protocol) network fabric.

17. Logic encoded on one or more non-transitory computer readable media for execution and when executed by a processor operable to:

discover at a network controller, a topology and link capacities for a network, the network controller operable to communicate with a plurality of spine nodes and plurality of leaf nodes comprising routers or switches, said link capacities comprising capacities for links between the spine nodes and the leaf nodes;

identify at the network controller, a flow of content received from a content source connected to one of the leaf nodes and separate from the network controller;

select at the network controller, one of the spine nodes to receive the content flow from the leaf node based, at least in part, on said link capacities; and program the network to transmit the content flow from the spine node to one of the leaf nodes in communication with a receiver requesting the content flow;

wherein each of the leaf nodes is directly connected to each of the spine nodes and wherein selecting the spine node comprises balancing the content flow across the plurality of spine nodes and uplinks transmitting flows from the leaf nodes to the spine nodes.

18. The logic of claim 17 further operable to generate a topology view of the network displaying connectivity and bandwidth.

19. The logic of claim 17 further operable to process bandwidth algorithms for use in selecting the spine node based on current usage of all of the spine nodes.

20. The logic of claim 17 further operable to provide delayed path stitching for optimized bandwidth usage.

* * * * *